United States Patent [19]
Kestle et al.

[11] Patent Number: 6,068,810
[45] Date of Patent: May 30, 2000

[54] INJECTION MOLDING MACHINE

[75] Inventors: Martin R Kestle, Everett; Hans B Luedke; Jerzy Szajak, both of Toronto, all of Canada

[73] Assignee: Husky Injection Molding Systems Ltd., Canada

[21] Appl. No.: 09/160,742

[22] Filed: Sep. 25, 1998

[51] Int. Cl.[7] .................................................. B29C 45/50
[52] U.S. Cl. .............................. 264/328.1; 92/2; 366/78; 425/587
[58] Field of Search .................. 264/219, 328.1; 425/542, 574, 582, 583, 587; 366/78, 79; 92/2

[56] References Cited

U.S. PATENT DOCUMENTS

| | | |
|---|---|---|
| 3,510,915 | 5/1970 | Johansson . |
| 3,810,728 | 5/1974 | Jacobs . |
| 4,005,641 | 2/1977 | Nussbaumer . |
| 4,824,255 | 4/1989 | Wohlrab . |
| 5,099,749 | 3/1992 | Darish . |
| 5,173,312 | 12/1992 | Julinot . |
| 5,540,495 | 7/1996 | Pickel . |
| 5,731,005 | 3/1998 | Hehl . |

*Primary Examiner*—Jill L. Heitbrink
*Attorney, Agent, or Firm*—Bachman & LaPointe, P.C.

[57] ABSTRACT

A plasticizing unit having a plasticizing screw, an injection piston connected to the screw, a quill connected to the piston, and hydraulic cavity formed by the piston and a quill end face. Hydraulic fluid is transferred to the hydraulic cavity to move the piston and screw away from the quill. The screw and piston are subsequently moved towards the quill to displace hydraulic fluid out of the hydraulic cavity and cause back pressure. The back pressure is counteracted by acting on the back of the quill.

14 Claims, 7 Drawing Sheets

INJECTION MOLDING MACHINE

BACKGROUND OF THE INVENTION

The present invention relates to a plastic injection molding machine and, more particularly, a plastic injection molding machine having a plasticizing unit and an injection unit.

Plastic injection molding machines typically employ plasticizing units and injection units for injecting resin into a mold. Reciprocating screws are generally employed for plasticizing plastic resin and either directly injecting the melted resin into a clamped mold or transferring the melted resin to a shooting pot. Various drive means can be employed to both rotate the screw for plasticizing and translating the screw inside the barrel so that it acts as an injection piston to force melted resin in front of the screw into the mold or into a shooting pot.

The plasticizing unit conventionally includes a heated cylinder which receives a plasticizing screw which is capable of rotational and axial movement inside the heated cylinder. Pellets of plastic are introduced into the heated cylinder and melted therein. Rotation of the plasticizing screw forces the pellets along the length of the heated cylinder until they form a pool of melted resin in front of the screw tip. A check valve provided on the screw tip prevents backflow of the melted resin as the screw is axially advanced into the cylinder by the injection unit thereby causing the resin to be forced out of the nozzle in the end of the heated cylinder. The nozzle on the end of the heated cylinder is sealed against the sprue bush of a mold and the action of forcing the resin into the mold is called plastic injection. Typically during the operation of the plastic injection molding machine the plasticizing screw in the cylinder, which both rotates and slides, develops high injection pressures typically in the area of 30,000 psi.

Figure 3:
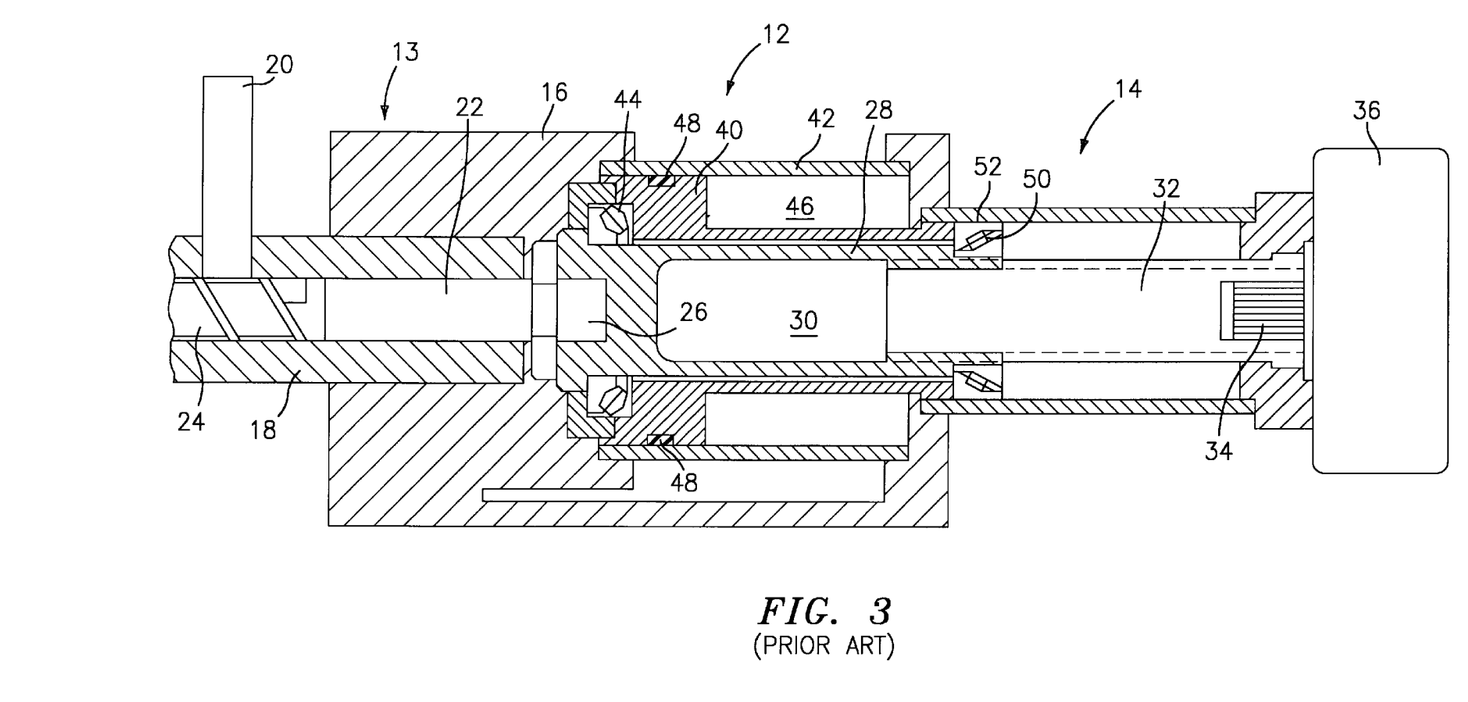

There have been various designs for the plasticizing and injection units of plastic injection molding machines in order to enable the plasticizing screw to both rotate and axially move within the heated plasticizing cylinder. A typical device is described and illustrated in U.S. Pat. No. 4,731,005 to Hehl. In the arrangement of the Hehl patent as best shown in FIG. 3, the injection piston 58 of the injection unit has a motor 63 attached directly to it for rotating the plasticizing screw. The motor in turn drives a quill 64 which is attached to the plasticizing screw 14. As the motor 63 rotates, the plasticizing screw 14 is driven via the quill 64 through a series of fixed couplings. As the pool of melted resin builds up in the front of the plasticizing screw 14, the screw is pushed toward the right along with the injection piston 58 which slides inside injection cylinder 57. Thrust bearing 55 transmits this back force to the injection piston while permitting the screw 14 to rotate. When sufficient resin has been plasticized, motor 63 is stopped in order to stop rotation of the plasticizing screw 14 and high pressure fluid is delivered into the injection cylinder 57 and acts on the righthand side of the injection piston 58 which causes the injection piston 58, the quill 64 and the plasticizing screw 14 to be moved to the left so as to inject the plastic resin from the cylinder and into a mold. As can be seen from the foregoing discussion and particularly FIG. 3 of the Hehl patent, the motor 63 reciprocates back and forth with the screw 14 and the injection piston 58. As a result of the fact that the motor is fixed to the injection piston and reciprocated therewith, the weight and inertia of the motor increases the wear on the bearings and seals of the assembly which is highly disadvantageous. In addition, a complicated attachment is required from the power supply to the reciprocating motor 63.

U.S. Pat. No. 5,173,312 to Julinot teaches a non-rotating injection piston containing a rotating quill for connecting the rotary motion from the motor to the screw. This unit requires more expensive bearings and is slightly longer when assembled. Also, the lubrication of the bearing nearest the screw is not conveniently executed. Finally, the diameter of the assembly of the '312 patent is relatively large for a given injection piston area because the '312 injection piston is annular.

Accordingly, it is a principal object of the present invention to provide an improved injection molding machine and the operation thereof including a plasticizing screw, injection piston and quill.

It is a further object of the present invention to provide an improvement as aforesaid which is simple and effective in operation.

It is a still further object of the present invention to provide an improvement as aforesaid which has an improved size configuration and which conveniently executes operations.

It is an additional object of the present invention to provide an improvement as aforesaid which provides a cost saving operation.

Further objects and advantages of the present invention will appear hereinbelow.

SUMMARY OF THE INVENTION

In accordance with the present invention, the foregoing objects and advantages are readily obtained.

The injection molding machine of the present invention comprises: a plasticizing unit having a plasticizing screw mounted within a cylinder; a rotatable and axially movable injection piston connected to said screw; a rotatable quill having a first end with a first end face, said first end connected to said piston, and a second end spaced from said piston; motor means connected to the second end of said quill for rotating said quill, piston and screw; a hydraulic cavity formed by the piston and quill end face; a hydraulic channel extending from the hydraulic cavity; means for transferring hydraulic fluid via said hydraulic channel to said hydraulic cavity to move said piston and screw away from said quill; means to subsequently move the screw and piston towards the quill to displace hydraulic fluid out of the hydraulic cavity into said hydraulic channel and cause back pressure in said channel; and means to counteract said back pressure acting on the second end of the quill. The means to counteract desirably includes a thrust bearing adjacent the second end of the quill and hydraulic pressure acting on the second end of the quill.

The process of the present invention comprises: mounting a plasticizing unit having a plasticizing screw within a cylinder; connecting a rotatable and axially movable injection piston to said screw; connecting the first end of a rotatable quill to said piston, wherein said first end has an end face; rotating said quill, piston and screw by a motor means connected to a second end of said quill; forming a hydraulic cavity by the piston and quill end face and communicating a hydraulic channel with the hydraulic cavity; transferring hydraulic fluid via said hydraulic channel to said hydraulic cavity and thereby moving said piston and screw away from the quill; subsequently moving the screw and piston towards the quill to displace hydraulic fluid out of the hydraulic cavity and into the hydraulic channel and to thereby cause back pressure in the channel; and counteracting the back pressure by acting on the second end of the quill. Desirably, the back pressure is counteracted by a thrust bearing adjacent the second end of the quill and by hydraulic pressure acting on the second end of the quill.

Further features and advantages of the present invention will appear hereinbelow.

BRIEF DESCRIPTION OF THE DRAWINGS

The present invention will be more readily understandable from a consideration of the accompanying exempificative drawings, wherein.

DETAILED DESCRIPTION OF PREFERRED EMBODIMENTS

Figure 1:
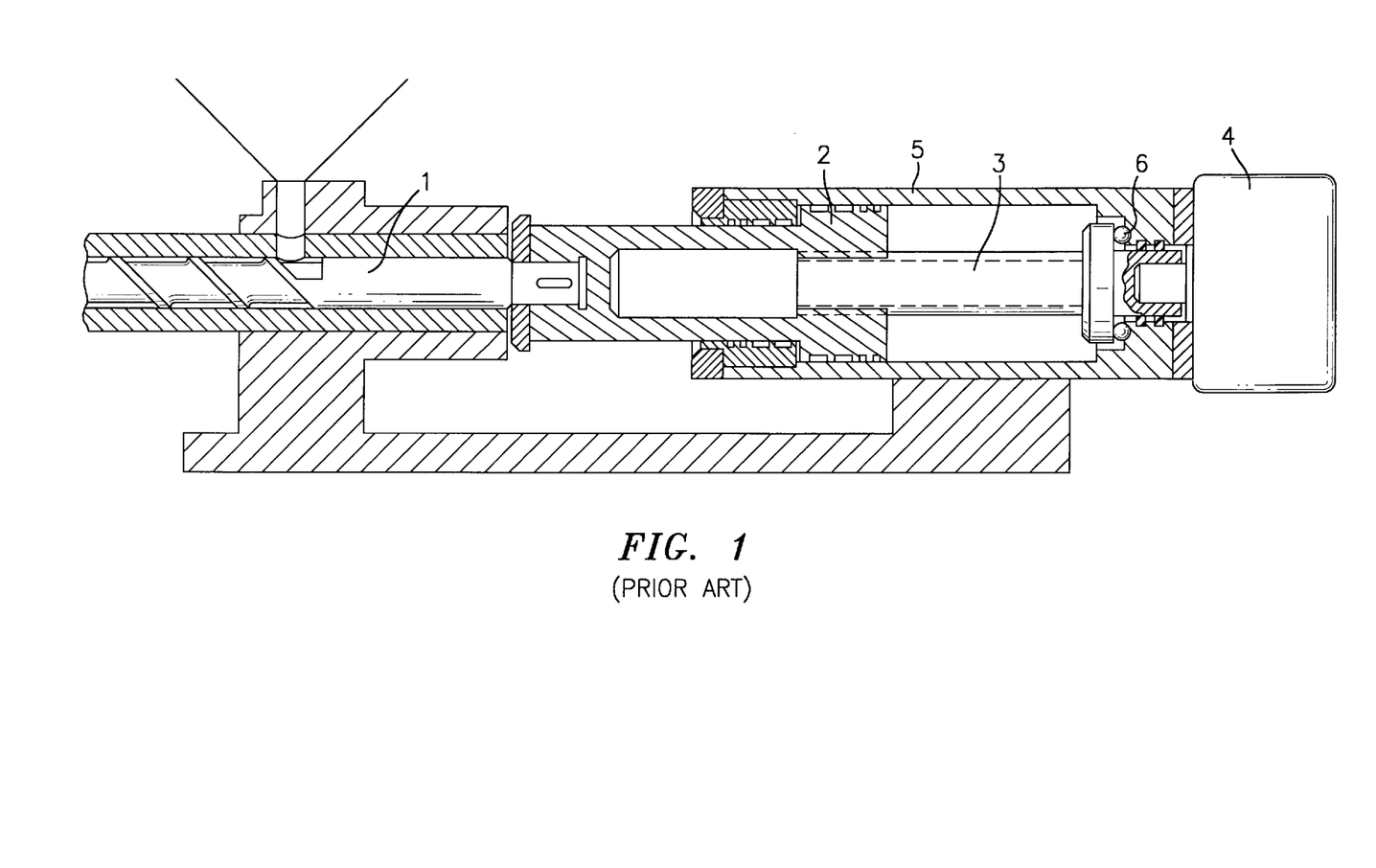
FIGS. 1, 2 and 3 are partly schematic illustrations of prior art plasticizing and injection units of a plastic injection molding machine.

FIG. 1 illustrates a prior art arrangement and shows schematically a plasticizing screw 1 directly mounted to an injection piston 2 which is provided with a bore having a spline which slides along a corresponding spline on quill 3. The quill 3 is rotated by motor 4 which is mounted on the stationary injection cylinder 5 and, therefore, does not reciprocate with the plasticizing screw 1. Upon rotation of the motor 4, the quill 3 is rotated and in turn rotatably drives injection piston 2 via the spline connection for imparting rotation to the plasticizing screw 1. In the arrangement of the prior art mechanism described in FIG. 1, the injection piston 2 rotates at the same speed as the screw 1 as well as reciprocating within injection cylinder 5 when injecting the melted plastic resin. Thus, the seals on the injection piston are subjected to very high wear from both the rotating and sliding action of the injection piston 2 within the injection cylinder 5.

Figure 2:
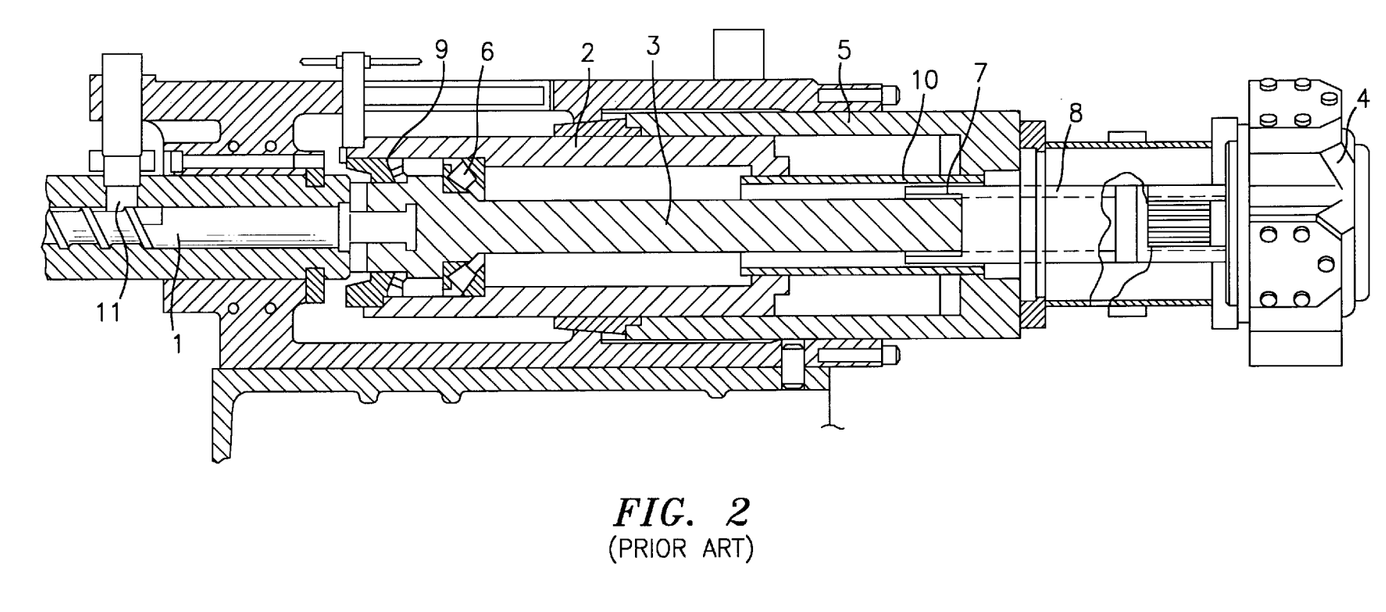

A further known arrangement is shown in FIG. 2 of the instant application which is an arrangement employed by the assignee of the instant invention. In the design shown in FIG. 2, the plasticizing screw 1 is connected to quill 3. The quill 3 is in turn mounted within a quill insert 8 by corresponding matching splines and the quill insert is connected to the output shaft of the motor 4. A large thrust bearing 6 and forward bearing 9 on the forward end of the quill support the assembly inside the injection piston 2 which slides within injection cylinder 5. A sleeve 10 is provided around a portion of quill 3 and quill insert 8 and the injection piston 2 slides in sealing engagement on the sleeve 10. The sleeve 10 separates the hydraulic fluid used in driving the injection piston 2 from the lubricating oil used for lubricating corresponding splines 7 and bearings 6 and 9. Thus, the arrangement of this mechanism has the advantage of employing a stationary motor, large thrust bearings and having the thrust bearings exposed to lubricating fluids so as to improve the life thereof. The arrangement, however, does suffer from the disadvantage that the overall length of the assembly from the feeder tube 11 to the motor 4 is excessively long.

FIG. 3 illustrates the arrangement of U.S. Pat. No. 5,173, 312 which shows a plastic injection molding machine including a plasticizing unit 12 and an injection unit 14 mounted in an injection molding housing 16. The plasticizing unit 12 includes a heated cylinder 18 and an inlet hopper 20 for feeding plastic pellets to the cylinder. A plasticizing screw 22 is mounted within the cylinder for rotational and axial movement therein. The plasticizing screw includes a screw portion 24 and a shank portion 26 which is received in quill 28 and secured therein for rotational and axial movement therewith.

Quill 28 is provided with a bore 30 which receives quill insert 32 therein. Quill insert 32 is connected to output 34 of motor 36 which imparts rotation to the quill insert and correspondingly to quill 28 and screw 22. Motor 36 is fixed to the housing of the injection molding machine in a stationary manner.

Injection piston 40 is mounted within injection cylinder 42 about quill 28 and is axially fixed on the quill. Thrust bearings 44 are carried by the quill and act on piston 40 so as to allow the quill to rotate independently of the piston. Seals 48 are provided on the outer periphery of piston 40 for sealing the piston against cylinder 42. An additional thrust bearing 50 is provided between an extension 52 of piston 40 and quill 28.

In operation of the FIG. 3 device, motor 36 rotates the plasticizing screw 22 through quill insert 32 and quill 28. Plastic pellets are fed to cylinder 18 via hopper 20. As the plastic pellets melt, a pool of molten resin builds up in front of the plasticizing screw which causes the plasticizing screw 22 to be moved backward (toward the right in the figure) along with the injection piston 40 which slides within injection cylinder 42. Thrust bearing 44 transmits this backward force to the injection piston 40 while allowing the plasticizing screw 22 to rotate. When sufficient resin has been plasticized, rotation of the plasticizing screw is stopped and high pressure hydraulic fluid is fed to chamber 46 which acts on injection piston 40 causing the injection piston 40 to move to the left within quill 28 and plasticizing screw 22 also therefore moves to the left which results in the injection of the molten resin from the cylinder 18 to a mold.

The present invention represents an improvement on the devices shown in FIGS. 1–3.

FIGS. 4–7 show a drive system for a plasticizing unit for a molding machine in accordance with the present invention.

Figure 4:
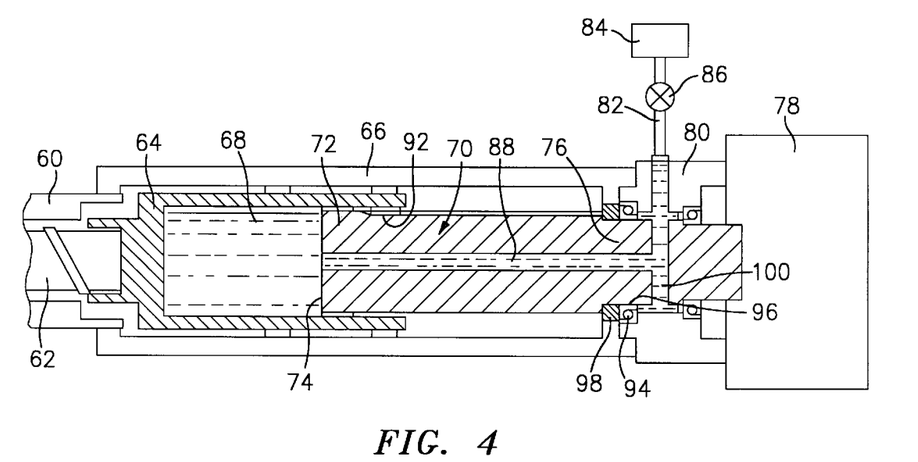
FIG. 4 is a sectional view of a unit of the present invention as plasticizing starts.

Referring to the drawings, barrel 60 contains plasticizing screw 62 which is removably connected to injection piston 64. The piston 64 can both rotate and slide inside sleeve 66. The injection piston or transfer piston 64 contains a recess or cavity 68 which contains quill 70 which is splined to the inside surface of piston 64, thereby transmitting rotary forces to the piston. Quill 70 has a first end 72 with an end face 74, with the first end 72 connected to piston 64, and a second end 76 spaced from piston 64. First end 72 of quill 70 slides within piston 64 and the opposed second end 76 of quill 70 is connected to the shaft of a rotary drive means or motor 78. The motor housing is mounted onto sleeve extension 80, which contains hydraulic feed line 82, which in turn is connected to a source of hydraulic fluid 84 with valve means 86 in line 82. Hydraulic channel 88 within quill 70 connects line 82 to piston cavity 68 such that pressurized oil 90 entering line 82 from source 84 acts on quill end face 74 and causes piston 64 to move away from quill 70 as shown in FIG. 4, thereby pushing screw 62 along barrel 60 and thereby causing melted plastic in front of the screw to be injected into the mold or shooting pot as described for FIG. 3 and in a known manner.

Injection motor 78 turns quill 70 which, via spline 92 causes piston 64 to rotate which in turn causes screw 62 to rotate and begin plasticizing more resin. As screw 62 pumps resin into the space in the barrel ahead of the screw tip, the accumulating resin causes the screw to move backward (to the right) in barrel 60. As this translation occurs, hydraulic oil 90 in cavity 68 is displaced out of channel 88 and feed line 82 and can be restricted by valve 86 to resist the screw's backward motion. Thus, a hydraulic pressure is built up in line 82 which causes back pressure in channel 88 and causes the screw to work harder thereby increasing the friction heating of the plastic in a known manner.

Figure 5:
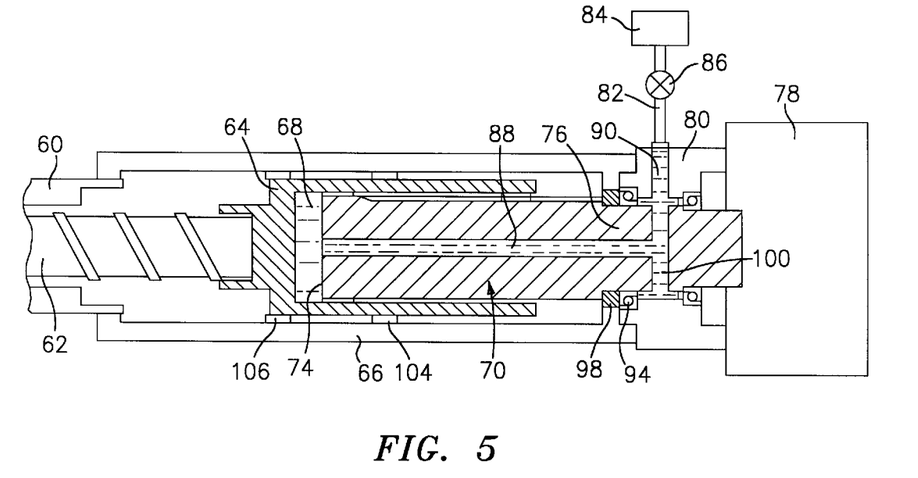
FIG. 5 is a sectional view of the unit of FIG. 4 as plasticizing ends and injection starts.

The screw continues to move backward to the position shown in FIG. 5 as melt accumulates until a sufficient volume of melt is prepared for the next shot. This is represented by the distance traveled by the screw and it is sensed by a sensor (not shown) which measures the position of the quill or the piston in a known manner.

Thrust bearing 94 is positioned adjacent the second end 76 of quill 70 in channel 96 and acts against quill extension 98 and quill 70 to resist back pressure of the rotating screw during melting. In addition, oil 90 from line 82 extends to bearing channel 96 via line 100 which communicates with line 82. Thus, it is a significant advantage of the present invention that the thrust bearing 94 that resists the back pressure of the rotating screw during melting can be of a smaller size than conventionally because part of the thrust is counteracted hydraulically by oil from lines 82 and 100 and channel 96 that also acts on the second end 76 of quill 70. Thus, the force on bearing 94 is the difference between the force generated on the quill end face 74 and the force generated on the second end 76 of quill 70 by hydraulic fluid 90 acting on quill extension 98.

In addition, bearing 94 is also advantageously constantly lubricated by being immersed in hydraulic oil from line 82 and line 100. This oil is desirably continuously filtered as part of the hydraulic system of the machine and therefore provides an ideal environment to prolong the life and minimize the wear on the thrust bearing. By being able to select a smaller thrust bearing, cost is reduced and the overall diameter of the unit can be minimized.

Figure 6:
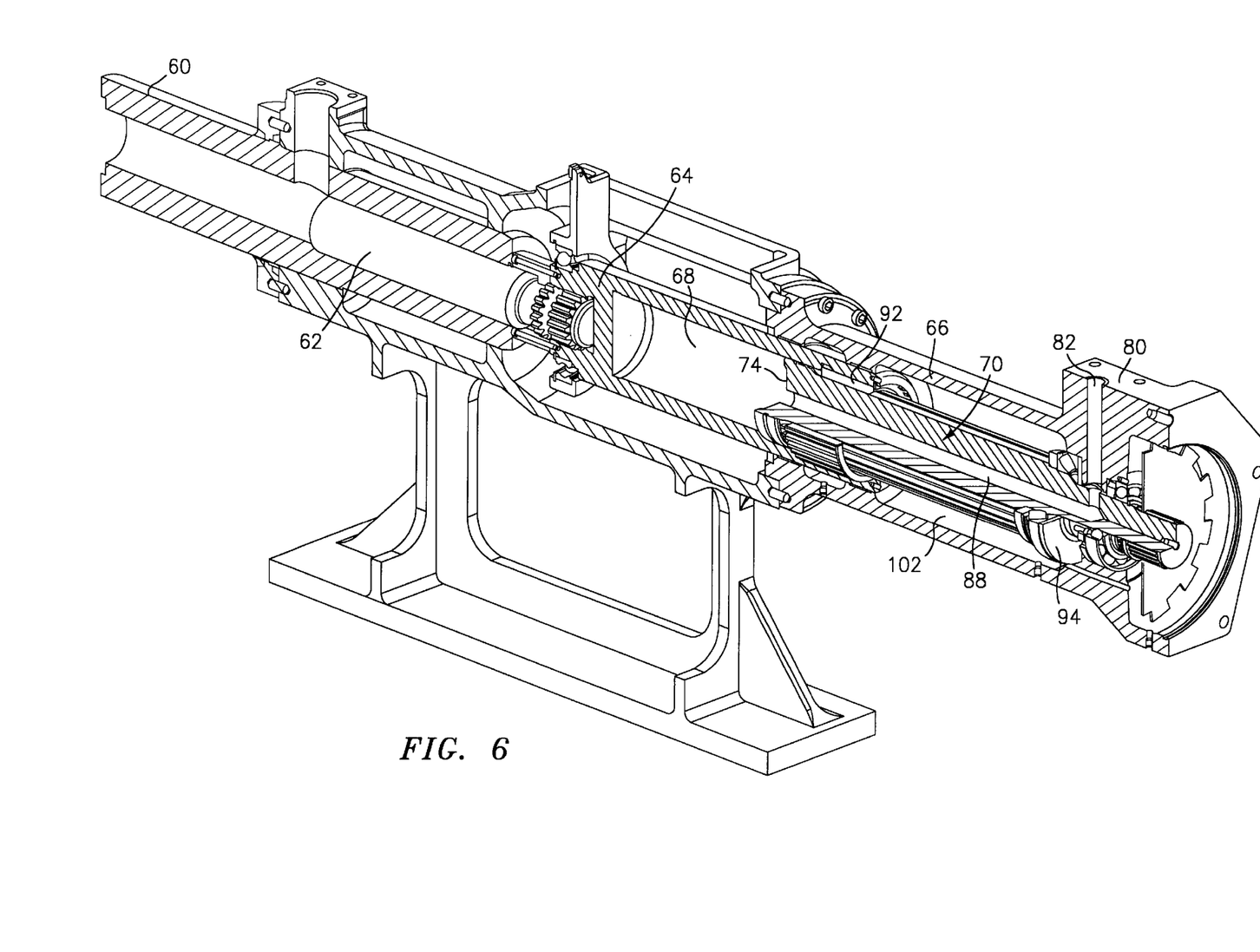
FIG. 6 is an isometric view of the unit of the present invention.
Figure 7:
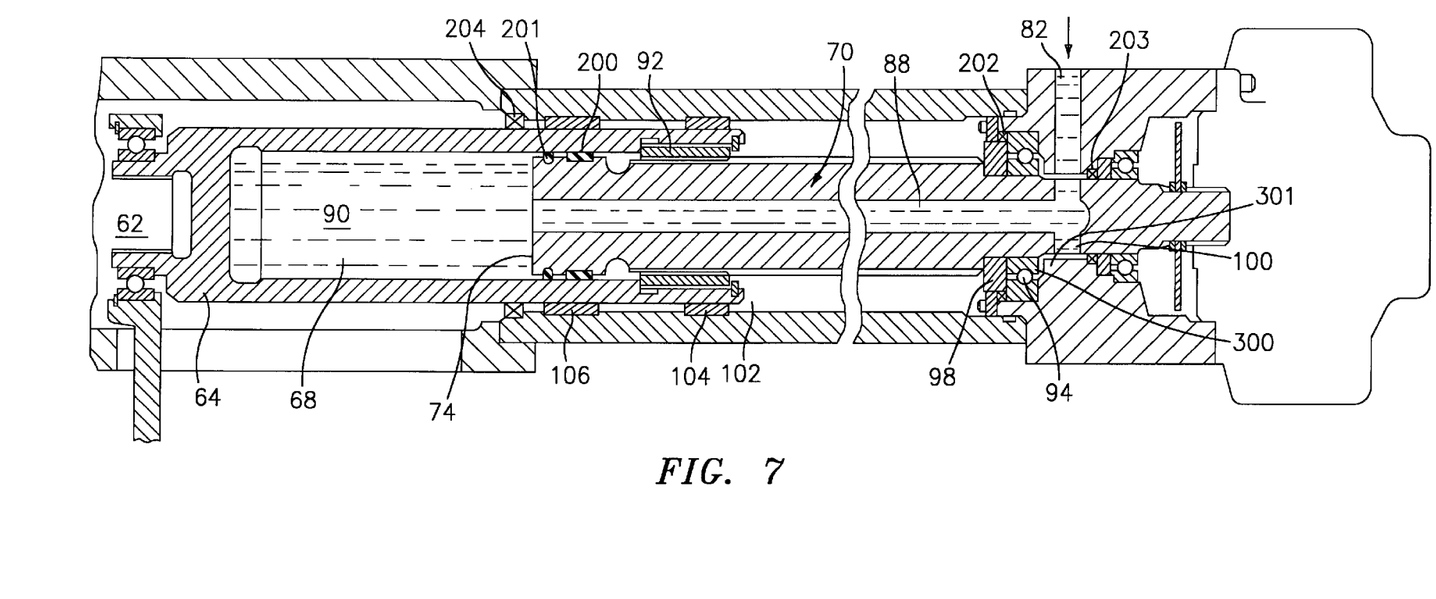
FIG. 7 is a further sectional view of the unit of the present invention.

In addition, the spline shaft connection between the quill and piston can be continuously lubricated by hydraulic oil allowed to accumulate into space 102 adjacent sleeve 66, see FIGS. 6–7. An additional cost savings of the present invention is the combination of the functions of rotary drive means to the screw and translation means into one item, the injection or transfer piston. Prior art units used multiple components to achieve these motions.

In accordance with the present invention, injection piston 64 both rotates, driven by motor 78 and driving screw 62, and reciprocates linearly. In order to prevent wear of components, wear rings 104, 106 are provided between sleeve 66 and piston 64, and wear ring 200 between piston 64 and quill 70.

The configuration shown in FIGS. 6–7 is an extruder drive unit for a two stage injection unit. Consequently, it is only required to transfer melted plastic to a shooting pot using comparatively low pressure oil and there is no requirement for the injection piston to be retracted hydraulically. There is no "suckback" feature where the screw is retracted to decompress the mold's hot runner system and minimize drool as at the gates. In a two stage injection unit, suckback can be provided by retracting the injection piston in the shooting pot. The injection piston in the extruder is not required to perform this function.

Therefore, with reference to FIG. 7, piston 64 is moved to the right by plastic pressure building up in front of the screw (left side not shown). When a large enough melt pool has been accumulated in front of the screw, low pressure oil is fed via channel 82 to cylinder 68 causing piston 64 to move to the left and transfer the melt at low pressure to the shooting pot (not shown). Thus, the only hydraulic oil that reaches space 102 is oil that has leaked past seal 201. Wear rings 200, 104 and 106 support the sliding and rotating of the injection piston 64 inside the casing and the quill 70 inside the piston. Lubricating oil is present in chamber 102 to lubricate spline 92 and bearing 94. Any hydraulic oil that leaks past seal 201 or seals 202 and 203 may be allowed to mix with the lubricating oil. Any lubricating oil that leaks past seal 204 may be drained from the housing by gravity. The oil in channels 82 and 100 acts on bearing 94 at 300 and the projected area of step 301 to counter the back pressure force described.

Figure 8:
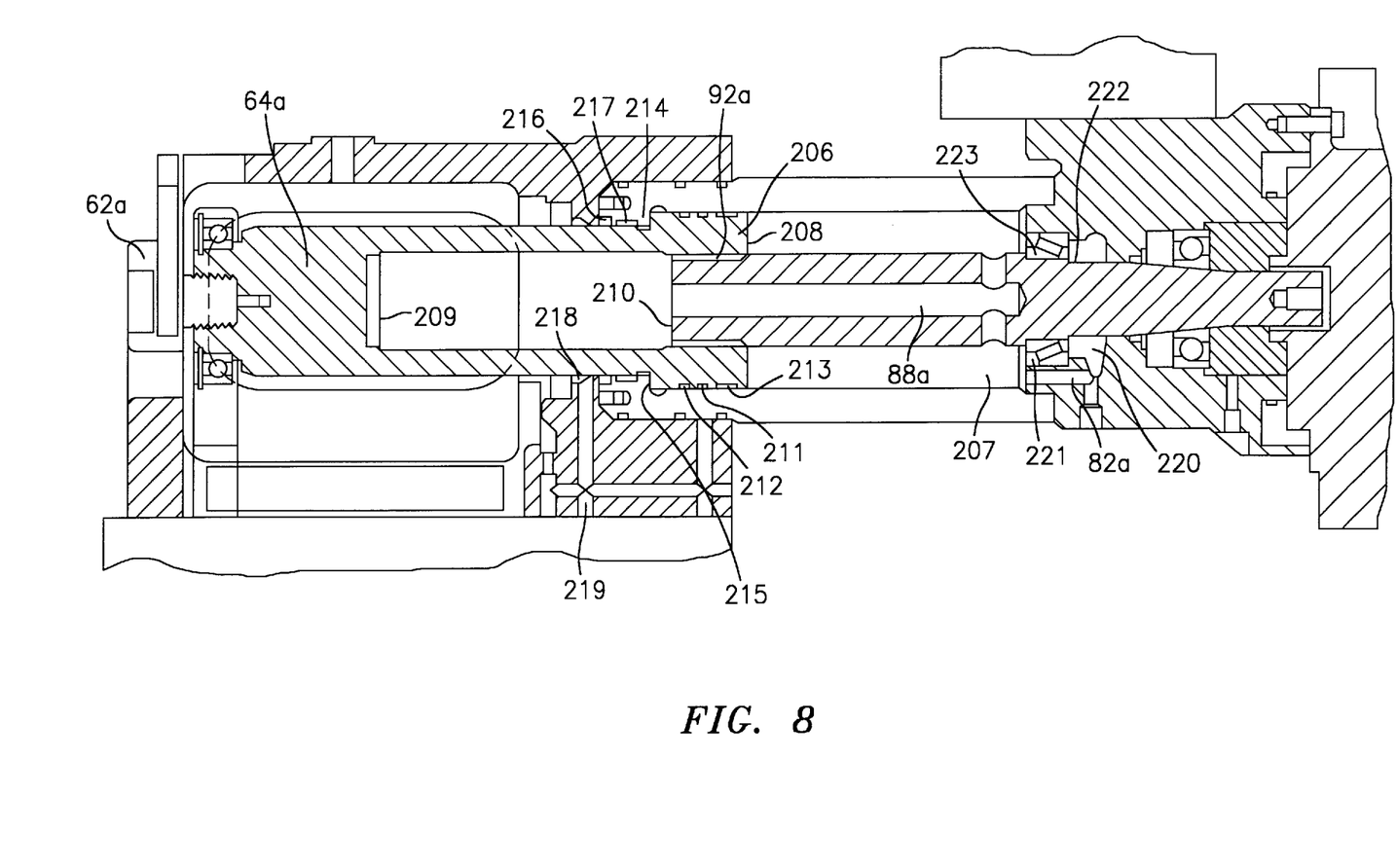
FIG. 8 is a sectional view of a further embodiment of the present invention.

The embodiment of FIG. 8 shows an injection drive unit configuration of the present invention for a reciprocating screw system. This is essentially the same as the unit of the present invention previously described except that high pressure oil must be used to operate the injection piston and a hydraulic means of retracting the screw for suckback is required.

Thus, referring to FIG. 8, the differences with the previous embodiment can be seen. Injection piston 64a is provided with head 206, both sides of which are subjected to hydraulic pressure. In order to inject plastic directly into the mold, high pressure hydraulic oil is supplied via channel 82a into 207 and thereby into channel 88a. The oil acts on faces 208 and 209 of the injection piston 64a. Seals 211 and 212 contain the high pressure oil after it passes over wear ring 213. Spline 92a is lubricated by the high pressure oil.

To return the injection piston hydraulically to provide the suckback feature for this injection unit, pressurized oil is fed to groove 214 by a channel (not shown) and thereby acts on the rod side of the injection piston head at 215. The high pressure oil is contained by seal 216. The rod is guided by wear ring 217. Hydraulic oil that leaks past seal 216 is collected in groove 218 and may be drained via channel 219. Similar to the configuration shown in FIG. 7, oil pressure in channel 220 counteracts the back pressure at the motor end of the quill by acting on the bearing 221 itself and the projected areas of the steps in the quill at 222 and 223, thereby allowing a smaller bearing to be utilized.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. The process which comprises:
    mounting a plasticizing unit having a plasticizing screw within a cylinder;
    connecting a rotatable and axially movable injection piston to said screw;
    connecting a first end of a rotatable quill to said piston, wherein said first end has an end face;
    rotating said quill, piston and screw by a motor means connecting to a second end of said quill;
    forming a hydraulic cavity by the piston and quill end face and communicating a hydraulic channel with the hydraulic cavity;
    transferring hydraulic fluid via said hydraulic channel to said hydraulic cavity and thereby moving said piston and screw away from the quill;

subsequently moving the screw and piston towards the quill to displace hydraulic fluid out of the hydraulic cavity and into the hydraulic channel and to thereby cause back pressure in the channel;

counteracting the back pressure by acting on the second end of the quill; and including counteracting said back pressure at least in part by a thrust bearing adjacent the second end of said quill and at least in part by hydraulic pressure acting on the second end of said quill, and wherein said hydraulic pressure acting on the second end of the quill includes lubricating said thrust bearing with hydraulic fluid.

2. Process according to claim 1, including locating said channel adjacent said quill.

3. Process according to claim 1, including locating said channel at least in part within said quill.

4. Process according to claim 1, including positioning said thrust bearing in a bearing channel, displacing hydraulic fluid out of the hydraulic channel into a hydraulic feed line, and communicating said hydraulic feed line with said bearing channel.

5. Process according to claim 4, including restricting hydraulic fluid flow from said hydraulic channel by valve means in said hydraulic feed line.

6. An injection molding machine comprising:

a plasticizing unit having a plasticizing screw mounted within a cylinder;

a rotatable and axially movable injection piston connected to said screw;

a rotatable quill having a first end with an end face, said first end connected to said piston, and a second end spaced from said piston;

motor means connected to the second end of said quill for rotating said quill, piston and screw;

a hydraulic cavity formed by the piston and quill end face;

a hydraulic channel extending from the hydraulic cavity;

means for transferring hydraulic fluid via said hydraulic channel to said hydraulic cavity to move said piston and screw away from said quill;

means to subsequently move the screw and piston towards the quill to displace hydraulic fluid out of the hydraulic cavity into said hydraulic channel and cause back pressure in said channel;

means to counteract said back pressure acting on the second end of the quill; and wherein said means to counteract includes a thrust bearing adjacent the second end of the quill and includes hydraulic pressure acting on the second end of the quill, and wherein said hydraulic pressure acting on the second end of the quill includes hydraulic fluid which lubricates the thrust bearing.

7. An injection molding machine according to claim 6, wherein said hydraulic channel is adjacent said quill.

8. An injection molding machine according to claim 6, wherein said hydraulic channel is located at least in part within said quill.

9. An injection molding machine according to claim 6, wherein the thrust bearing is located in a bearing channel.

10. An injection molding machine according to claim 9, wherein said hydraulic channel communicates with a hydraulic feed line, and wherein said hydraulic feed line communicates with said bearing channel.

11. An injection molding machine according to claim 10, including valve means in said hydraulic feed line to restrict hydraulic fluid flow from said hydraulic channel.

12. An injection molding machine according to claim 6, including wear rings that support the piston and quill.

13. An injection molding machine according to claim 6, including a two stage injection unit.

14. An injection molding machine according to claim 6, including a reciprocating screw system.

* * * * *